(12) United States Patent
Liu et al.

(10) Patent No.: US 12,406,775 B2
(45) Date of Patent: Sep. 2, 2025

(54) REACTOR SECONDARY SIDE PASSIVE RESIDUAL HEAT REMOVAL SYSTEM

(71) Applicant: SHANGHAI NUCLEAR ENGINEERING RESEARCH & DESIGN INSTITUTE CO., LTD., Shanghai (CN)

(72) Inventors: Zhan Liu, Shanghai (CN); Di Liu, Shanghai (CN); Haitao Wang, Shanghai (CN); Bo Yang, Shanghai (CN); Kemei Cao, Shanghai (CN); Zhanfei Qi, Shanghai (CN)

(73) Assignee: SHANGHAI NUCLEAR ENGINEERING RESEARCH & DESIGN INSTITUTE CO., LTD., Shanghai (CN)

( * ) Notice: Subject to any disclaimer, the term of this patent is extended or adjusted under 35 U.S.C. 154(b) by 277 days.

(21) Appl. No.: 17/996,528

(22) PCT Filed: Apr. 21, 2021

(86) PCT No.: PCT/CN2021/088570
§ 371 (c)(1),
(2) Date: Oct. 19, 2022

(87) PCT Pub. No.: WO2021/213415
PCT Pub. Date: Oct. 28, 2021

(65) Prior Publication Data
US 2023/0223160 A1     Jul. 13, 2023

(30) Foreign Application Priority Data
Apr. 24, 2020 (CN) .......................... 202010332404.6

(51) Int. Cl.
*G21C 15/18*     (2006.01)
*G21C 15/12*     (2006.01)
(Continued)

(52) U.S. Cl.
CPC ............. *G21C 15/12* (2013.01); *G21C 15/18* (2013.01); *G21C 15/243* (2013.01); *G21C 17/032* (2013.01); *G21D 3/04* (2013.01)

(58) Field of Classification Search
CPC ......... G21D 3/04; G21C 15/18; G21C 15/243
See application file for complete search history.

(56) References Cited

U.S. PATENT DOCUMENTS 4,113,561 A * 9/1978 Fidler .................... G21C 15/18
                                                                             976/DIG. 298
5,428,652 A * 6/1995 Conrads ................. G21C 15/18
                                                                                    376/299
(Continued)

FOREIGN PATENT DOCUMENTS

CN       102867548 A      1/2013
CN       103617815 A *    3/2014
(Continued)

OTHER PUBLICATIONS

First Office Action dated Feb. 29, 2024 for corresponding Chinese Application No. 202010332404.6 and English translation.
(Continued)

*Primary Examiner* — Lily C Garner
(74) *Attorney, Agent, or Firm* — Chrisman Gallo Tochtrop LLC

(57) ABSTRACT

Provided is a reactor secondary side passive residual heat removal system, comprising: a containment vessel; a steam generator provided with a steam outlet and a water supply inlet; a water tank, the water tank being internally provided with a heat exchanger, the heat exchanger having a heat exchanger inlet and a heat exchanger outlet; and a steam driven pump provided with a steam port, a water inlet and a water outlet, wherein the steam generator, the water tank and the steam driven pump are arranged in the containment vessel, the heat exchanger inlet is in communication with the
(Continued)

steam outlet of the steam generator by means of a first pipeline, the heat exchanger outlet is in communication with the water inlet of the steam driven pump by means of a second pipeline, the water outlet of the steam driven pump is in communication with the water supply inlet of the steam generator by means of a third pipeline, and the steam port of the steam driven pump is in communication with the first pipeline by means of a fourth pipeline. The present invention does not rely on an external driving force, thereby greatly reducing the failure probability of the system and improving the safety of the system.

10 Claims, 1 Drawing Sheet

(51) Int. Cl.
*G21C 15/243* (2006.01)
*G21C 17/032* (2006.01)
*G21D 3/04* (2006.01)

(56) References Cited

U.S. PATENT DOCUMENTS

| | | | | |
|---|---|---|---|---|
| 8,817,941 | B2 * | 8/2014 | Sato | G21C 1/086 |
| | | | | 376/361 |
| 10,115,488 | B2 * | 10/2018 | Han | G21C 1/322 |
| 2009/0129530 | A1 * | 5/2009 | Reyes, Jr. | G21C 1/32 |
| | | | | 376/282 |
| 2016/0322121 | A1 | 11/2016 | Kim et al. | |
| 2018/0240558 | A1 * | 8/2018 | Sato | G21C 15/182 |
| 2018/0350472 | A1 * | 12/2018 | Fu | G21C 15/182 |

FOREIGN PATENT DOCUMENTS

| | | | | | |
|---|---|---|---|---|---|
| CN | 103632737 | A | | 3/2014 | |
| CN | 103778976 | A | | 5/2014 | |
| CN | 104167230 | A | | 11/2014 | |
| CN | 104505130 | A | * | 4/2015 | |
| CN | 108511090 | A | | 9/2018 | |
| CN | 108831573 | A | | 11/2018 | |
| CN | 109243634 | A | * | 1/2019 | G21C 15/18 |
| CN | 109273112 | A | | 1/2019 | |
| CN | 110010255 | A | | 7/2019 | |
| CN | 110164569 | A | | 8/2019 | |
| CN | 111128414 | A | * | 5/2020 | G21C 15/02 |
| CN | 111430050 | A | | 7/2020 | |
| CN | 212847699 | U | | 3/2021 | |
| EP | 2911156 | A1 | * | 8/2015 | G21C 15/18 |
| GB | 2520455 | A | | 5/2015 | |
| GB | 2531190 | A | * | 4/2016 | G21C 13/02 |
| KR | 101250479 | B1 | * | 4/2013 | |
| KR | 101297101 | B1 | * | 8/2013 | |
| KR | 101624561 | B1 | * | 5/2016 | |
| WO | 2014/029306 | A1 | | 2/2014 | |

OTHER PUBLICATIONS

First Office Action dated Mar. 15, 2024 for corresponding Turkish Application No. 2022/015829 and English translation.

International Search Report for corresponding International Application No. PCT/CN2021/088570 mailed Jul. 2, 2021.

Written Opinion for corresponding International Application No. PCT/CN2021/088570 dated Jul. 2, 2021.

* cited by examiner

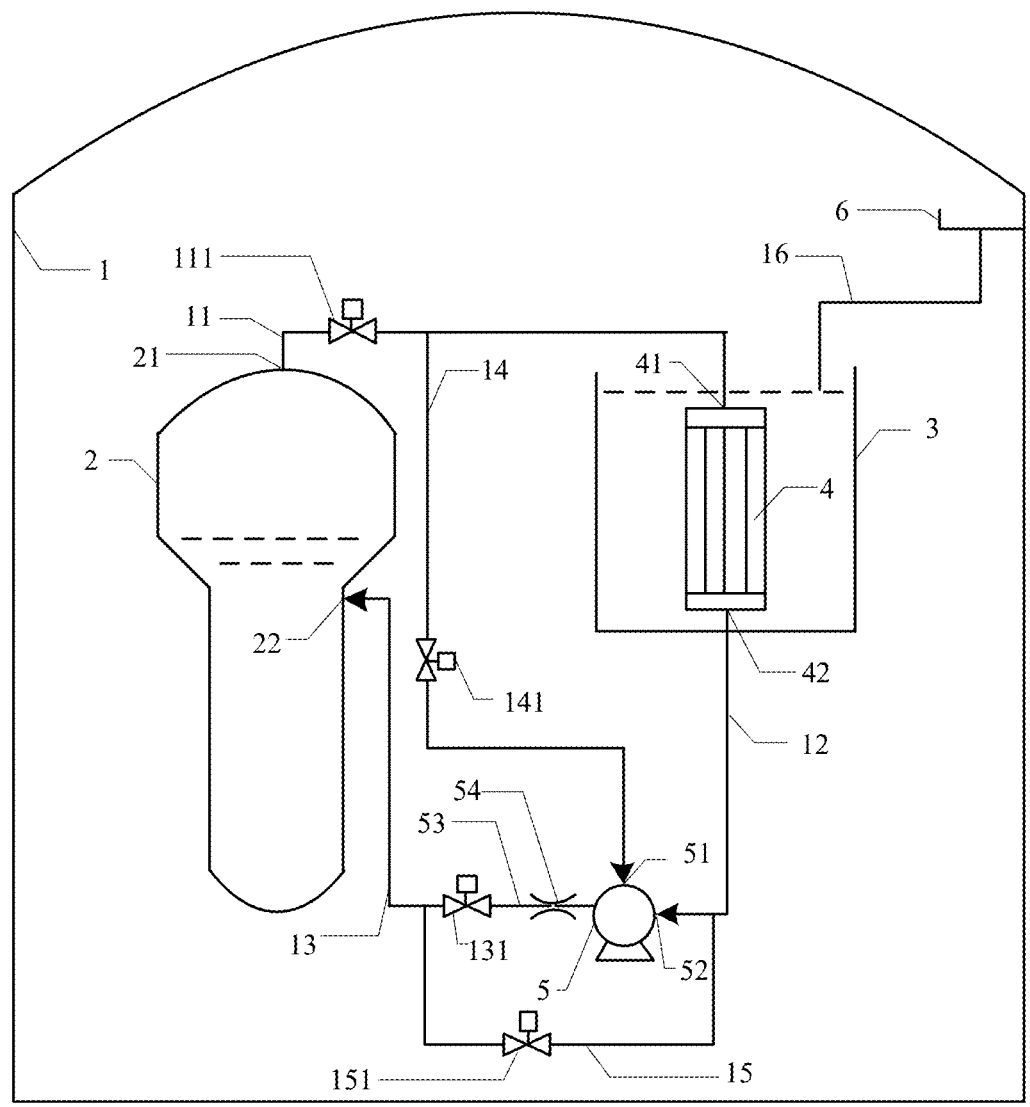

REACTOR SECONDARY SIDE PASSIVE RESIDUAL HEAT REMOVAL SYSTEM

TECHNICAL FIELD

The present invention relates to the technical field of reactor protection, and in particular to a reactor secondary side passive residual heat removal system.

BACKGROUND

During normal operation of a reactor, the core fission heat released from the core is brought out by a steam generator to ensure the stable operation of a nuclear island and a conventional island. Steam from the steam generator flows to a turbine to do work through a top steam outlet, and water is fed through a feedwater inlet of the steam generator from a main feedwater pipe. Once the main feedwater loss accident occurs to the steam generator, the steam generator will have limited heat removal capacity, and the heat released from the core will be mismatched with the heat brought out by the steam generator. In such circumstance, if there is no effective heat removal system, the heat released from the reactor core could not be extracted, causing deterioration of the reactor core heating and even core meltdown.

In conventional nuclear power plants, an active secondary side residual removal system is used to bring out the core decay heat. This type of active system relies heavily on external power, and once the external power is not available, the core residual heat will not be continuously brought out. If there is no safety mitigation measures, the plant will eventually face a serious accident, even cause substantial radioactive release hazard.

After the Fukushima nuclear accident, more and more attention has been paid to passive technology for its safety, reliability and economy. It does not rely on external input (force, power or signal, manual operation) and its effect depends on natural physical laws (such as gravity, natural convection, heat conduction, etc.), inherent characteristics (such as material properties), or energy in the system (such as chemical reaction, decay heat, etc.). Therefore, it is of great significance and value for reactors to be equipped with a passive residual heat removal system.

SUMMARY OF THE INVENTION

The present invention provides a reactor secondary side passive residual heat removal system, which can efficiently and stably bring out the heat of the reactor core and improve the safety of the system.

The reactor secondary side passive residual heat removal system of the present invention comprises: a containment vessel; a steam generator having a steam outlet and a feedwater inlet; a water tank in which a heat exchanger having a heat exchanger inlet and a heat exchanger outlet is arranged; and a steam driven pump having a steam port, an water inlet and a water outlet; wherein the steam generator, the water tank and the steam driven pump are placed in the containment vessel, the heat exchanger inlet is communicated with the steam outlet of the steam generator through a first pipe, the heat exchanger outlet is communicated with the water inlet of the steam driven pump through a second pipe, the water outlet of the steam driven pump is communicated with the feedwater inlet of the steam generator through a third pipe, and the steam port of the steam driven pump is communicated with the first pipe through a fourth pipe.

Preferably, the first pipe is provided with a first isolation valve, the third pipe is provided with a second isolation valve, and the fourth pipe is provided with a third isolation valve.

Preferably, the first isolation valve, the second isolation valve and the third isolation valve are normally closed electric isolation valves.

Preferably, the first isolation valve, the second isolation valve and the third isolation valve are opened simultaneously after receiving the opening signal.

Preferably, the heat exchanger outlet is communicated with the feedwater inlet of the steam generator through a fifth pipe, and the fifth pipe is provided with a bypass valve.

Preferably, the third pipe is provided with a flow sensor, and when the flow sensor detects that the flow on the third pipe is lower than a preset value, the bypass valve is opened and the second isolation valve is closed.

Preferably, the bottom elevation of the heat exchanger is higher than the top elevation of the steam generator.

Preferably, the inner wall surface of the containment vessel is provided with a recovery tank, and a sixth pipe is provided between the recovery tank and the water tank, wherein one end of the sixth pipe is connected to bottom of the recovery tank, the other end of the sixth pipe is placed into an upper part of the water tank and the bottom elevation of the recovery tank is higher than the top elevation of the water tank.

Preferably, the top of the containment vessel is in an arc shape.

Preferably, the recovery tank is arranged circumferentially along the inner wall surface of the containment vessel.

The reactor secondary side passive residual heat removal system of the present invention adopts a steam driven pump to strengthen the flow of the system loop fluid, enhance the heat removal capacity of the system, and utilize the vaporization and condensation in the system loop to efficiently and stably bring out the residual heat of the reactor core. By adopting passive safety design concept without relying on external driving force, the failure probability of the system can be greatly reduced, and the safety and economy of the system can be further improved.

BRIEF DESCRIPTION TO THE DRAWING

In order to more clearly illustrate the technical solution of the embodiments of the present application, the following will briefly introduce the drawings required for use in the embodiments of the present application, it is obvious to a person skilled in the art that the drawings described below are only some embodiments of the present application, and other drawings can be obtained according to the drawings without creative work.

FIG. 1 is a schematic diagram of a reactor secondary side passive residual heat removal system according to an embodiment of the present invention;

In the drawings, the drawings are not drawn to the actual scale.

REFERENCE NUMBERS

1: containment vessel;
11: first pipe;
111: first isolation valve;
12: second pipe;
13: third pipe;
131: second isolation valve;
14: fourth pipe;

141: third isolation valve;
15: fifth pipe;
151: bypass valve;
16: sixth pipe;
2: steam generator;
21: steam outlet;
22: feedwater inlet;
3: water tank;
4: heat exchanger;
41: heat exchanger inlet;
42: heat exchanger outlet;
5: steam driven pump;
51: water inlet;
52: water outlet;
6: recovery tank.

MODE OF CARRYING OUT THE INVENTION

The embodiments of the present application will be described in further detail with reference to the following drawings and embodiments. The following detailed description and drawings of the embodiments are used to illustrate the principles of the application, but they should not be used to limit the scope of the application, that is, the application is not limited to the described embodiments.

In the description of the present invention, unless otherwise stated, it should be understood that "multiple" means more than two, the directions or positional relationships indicated by the terms "upper", "lower", "left", "right", "inside" and "outside" are only for convenience and simplification of the description of this application, but do not indicate or imply that the referred devices or elements must have a specific orientation, or must be constructed and operated in a specific orientation. Therefore, it cannot be understood as a limitation of the present application. In addition, the terms "first", "second", "third" and the like are only used for illustrative purposes and cannot be understood as indicating or implying relative importance.

The terms of locality appearing in the following description are all directions shown in the drawing and are not intended to limit the specific structure of the present application. In the description of this application, it should also be noted that, unless otherwise specified and defined, the terms "communicate", "connect" and "connecting" should be understood in a broad sense, for example, they can be fixed connections, detachable connections, or integral connections, and they can be direct connections or indirect connections through an intermediate medium. To a skilled person in the art, the specific meanings of the above terms in this application can be understood according to specific situations.

FIG. 1 is a schematic diagram of a reactor secondary side passive residual heat removal system according to an embodiment of the present invention.

As shown in FIG. 1, the reactor secondary side passive residual heat removal system according to the present invention comprises a containment vessel 1, a steam generator 2, a water tank 3 and a steam driven pump 5, wherein the steam generator 2, the water tank 3 and the steam driven pump 5 are placed in the containment vessel. The containment vessel 1 is used to protect the steam generator 2, the water tank 3 and the steam driven pump 5 from damages due to the environment, and to limit the release of potential radioactive gas in the containment vessel to the outside after an accident.

During operation of the reactor (not shown in the FIG. 1), heat generated by the fission of the reactor core needs to be brought out by the steam generator 2 to release the heat of the reactor. The steam generator 2 has a steam outlet 21 and a feedwater inlet 22. The steam generated from heat absorption by the steam generator 2 is discharged through the steam outlet 21. The feedwater inlet 22 is used to provide cooling water to the steam generator 2 for heat exchange.

The water tank 3 is provided with a heat exchanger 4, wherein the water tank 3 contains liquid water that can exchange heat with the heat exchanger 4, the heat exchanger 4 is immersed in the water of the water tank 3, and the heat exchanger 4 has a heat exchanger inlet 41 and a heat exchanger outlet 42. The steam driven pump 5 has a steam port 51, an water inlet 52 and a water outlet 53, the heat exchanger inlet 41 is communicated with the steam outlet 21 of the steam generator 2 through a first pipe 11, the heat exchanger outlet 42 is communicated with the water inlet 52 of the steam driven pump 5 through a second pipe 12, the water outlet 53 of the steam driven pump 5 is communicated with the feedwater inlet 22 of the steam generator 2 through a third pipe 13, and the steam port 51 of the steam driven pump 5 is communicated with the first pipe 11 through a fourth pipe 14. Part of the steam generated from heat absorption by the steam generator 2 enters the heat exchanger 4 through the first pipe 11, and the steam is condensed into liquid water after heat exchange with the water in the water tank 3. Then, the liquid water in the heat exchanger 4 flows into the second pipe 12 through the heat exchanger outlet 42, and flows into the water inlet 52 of the steam driven pump 5 through the second pipe 12. After the liquid water enters the steam driven pump 5, the steam driven pump 5 drives the liquid water to flow into the third pipe 13 through the water outlet 53, and flows to the feedwater inlet 22 of the steam generator 2. The other part of the steam flows to the steam port 51 of the steam driven pump 5 through the fourth pipe 14 to drive the steam driven pump 5 for doing work. The steam driven pump 5 can enhance the flow of the system loop fluid and enhance the heat removal capacity of the system. The steam driven pump 5 does not depend on external power and has a passive design concept, which simplifies the equipment and improves the safety and economy of the system.

In an embodiment of the present invention, the first pipe 11 is provided with a first isolation valve 111 for controlling the opening and closing of conveying steam from the steam generator 2 to the heat exchanger 4. The third pipe 13 is provided with a second isolation valve 131 for controlling the heat exchanger 4 to convey liquid water to the steam generator 2. The fourth pipe 14 is provided with a third isolation valve 141 for controlling the start and stop of the steam driven pump 5. The fourth pipe 14 is communicated with the first pipe 11 and can be connected to an input end side of the first isolation valve 111, preferably can be connected to an output end side of the first isolation valve 111 as shown in FIG. 1, so as to prevent the third isolation valve 141 from opening when the first isolation valve 111 is not opened so as to prevent from causing the steam driven pump 5 to start first.

In an embodiment of the present invention, the first isolation valve 111, the second isolation valve 131 and the third isolation valve 141 are normally closed electric isolation valves. The reactor secondary side passive residual heat removal system of the present invention is arranged on the secondary side of the steam generator 2. During normal operation of the reactor, the first isolation valve 111, the second isolation valve 131 and the third isolation valve 141 are closed, and the reactor secondary side passive residual heat removal system of the present invention is in a standby state. At this time, steam from the steam generator 2 flows to the turbine (not shown in FIG. 1) to do work through the steam outlet 21 on top of the steam generator 2, and water is fed through the feedwater inlet 22 of the steam generator 2 from a main feedwater pipe (not shown in FIG. 1). All of them form a main discharge system. In case of an accident, once the main discharge system is unavailable, for example, when the main feedwater loss accident occurs, the first isolation valve 111, the second isolation valve 131 and the third isolation valve 141 will receive an opening signal, and the first isolation valve 111, the second isolation valve 131 and the third isolation valve 141 will be opened at the same time after receiving the opening signal. At this time, the reactor secondary side passive residual heat removal system of the present invention starts to operate. The opening signal received by the first isolation valve 111, the second isolation valve 131 and the third isolation valve 141 may be a trigger signal sent after the liquid level detected by the liquid level detection mechanism in the steam generator 2 is lower than a preset value, or a trigger signal sent when the temperature of the primary circuit system of the reactor (not shown in FIG. 1) is higher than a preset value.

The first isolation valve 111, the second isolation valve 131 and the third isolation valve 141 are normally closed electric isolation valves. On one hand, it can ensure that the first isolation valve 111, the second isolation valve 131 and the third isolation valve 141 are normally closed during the normal operation of the reactor, on the other hand, the electric isolation valve can be used to set the opening speed of the isolation valve to facilitate the slow opening of the first isolation valve 111, the second isolation valve 131 and the third isolation valve 141, so as to prevent water hammer and facilitate the stable operation of the system.

In an embodiment of the present invention, the heat exchanger outlet 42 is communicated with the feedwater inlet 22 of the steam generator 2 through a fifth pipe 15, and the fifth pipe 15 is provided with a bypass valve 151. Herein, the heat exchanger outlet 42 being communicated with the feedwater inlet 22 of the steam generator 2 through the fifth pipe 15 may be implemented as follows: both ends of the fifth pipe 15 may be directly connected to the heat exchanger outlet 42 and the feedwater inlet 22 of the steam generator 2 respectively; or both ends of the fifth pipe 15 may be connected to the second pipe 12 and the third pipe 13, respectively, and indirectly connected to the heat exchanger outlet 42 and the feedwater inlet 22 of the steam generator 2. The steam from the steam generator 2 is condensed into liquid water after heat exchange with the water in the water tank 3 through the heat exchanger 4. Instead of being driven by the steam driven pump 5, the steam can flow directly to the feedwater inlet 22 of the steam generator 5 through the fifth pipe 15.

In an embodiment of the present invention, the third pipe 13 is provided with a flow sensor 54. When the flow sensor 54 detects that the flow on the third pipe 13 is lower than a preset value, it indicates that the driving force of the steam driven pump 5 is low, and the flow of the third pipe 13 under 10 the driving force of the steam driven pump 5 is lower than the flow of the third pipe 13 during natural circulation. Therefore, the bypass valve 151 can be opened, and the third isolation valve 141 can be closed to stop the steam driven pump 5. At this time, the steam from the steam generator 2 is condensed into liquid water after heat exchange with the water in the water tank 3 through the 15 heat exchanger 4, and flows directly to the feedwater inlet 22 of the steam generator 5 through the fifth pipe 15. The fluid is driven to form natural circulation in the system by the density difference between the cold and hot fluids, and the residual heat of the reactor core is brought out.

In an embodiment of the present invention, the bottom elevation of the heat exchanger 4 is higher than the top elevation of the steam generator 2, so that the liquid water from the heat exchanger outlet 42 can flow into the steam generator 2 under the action of gravity.

In an embodiment of the present invention, the inner wall surface of the containment vessel 1 is provided with a recovery tank 6, and a sixth pipe 16 is provided between the recovery tank 6 and the water tank 3, wherein one end of the sixth pipe 16 is connected to the bottom of the recovery tank 6, the other end of the sixth pipe 16 is placed at the upper part of the water tank 3 and the bottom elevation of the recovery tank 6 is higher than the top elevation of the water tank 3. The end of the sixth pipe 16 being placed at the upper part of the water tank 3 may be implemented as follows: this end may extend into the water tank 3; or this end may be placed only above the water tank 3. Since the steam from the steam generator 2 is continuously conveyed to the heat exchanger 4 for heat exchange, the water in the water tank 3 will be continuously heated until it is saturated and evaporated. The evaporated water vapor is cooled by the inner wall surface of the containment vessel 1, flows into the recovery tank 6, and flows back to the water tank 3 through the sixth pipe 16 so as to avoid a large amount of water loss in the water tank 3. The heat of the inner wall surface of the containment vessel 1 is carried to the outer wall surface thereof through heat conduction, and finally discharged into the atmosphere through convection heat exchange.

In an embodiment of the present invention, it can be seen from FIG. 1 that the top of the containment vessel 1 is in a circular arc shape, so that the water vapor flows into the recovery tank 6 after being cooled by the inner wall surface of the containment vessel 1.

In an embodiment of the present invention, the recovery tank 6 is arranged circumferentially along the inner wall surface of the containment vessel 1, and the recovery tank 6 is arranged in a ring shape along the inner wall surface of the containment vessel 1 to facilitate the recovery of condensed water flowing from the inner wall surface of the containment vessel 1 in all directions.

In the reactor secondary side passive residual heat removal system of the present invention, during normal operation of the reactor, the first isolation valve 111, the second isolation valve 131 and the third isolation valve 141 are closed, and the reactor secondary side passive residual heat removal system of the present invention is in a standby state. In case of an accident, once the main discharge system is unavailable, for example, when the main feedwater loss accident occurs, the first isolation valve 111, the second isolation valve 131 and the third isolation valve 141 will be opened at the same time after receiving the opening signal. At this time, the reactor secondary side passive residual heat removal system of the present invention starts to operate. A part of the steam generated from endothermic vaporization by the steam generator 2 enters the heat exchanger 4 and condenses into liquid water after heat exchange with the water in the water tank 3, which is then driven by the steam driven pump 5 to the feedwater inlet 22 of the steam generator 2; the other part of the steam flows to the steam port 51 of the steam driven pump 5 and drives the steam driven pump 5 to do work. Heat exchange with the heat exchanger 4 is performed to realize the extract of the reactor core heat. When the water flow rate driven by the steam driven pump 5 to the feedwater inlet 22 of the steam generator 2 is lower than the preset value, the third isolation valve 141 is closed to shut down the steam driven pump 5, and the bypass valve 151 is opened, and the steam from the steam generator 2 is condensed into liquid water after heat exchange with the water in the water tank 3 through the heat exchanger 4, and flows directly to the feedwater inlet 22 of the steam generator 5 through the fifth pipe 15. The fluid is driven to form natural circulation in the system by the density difference between the cold and hot fluids, and the residual heat of the reactor core is brought out. During the accident, as the system continues to bring out heat and the decay heat of the core decreases, the heat removal capacity of the system will eventually match the decay heat of the core, and the nuclear power plant will no longer have more serious accident conditions.

The reactor secondary side passive residual heat removal system according to the present invention is arranged on the secondary side of the steam generator 2, wherein the steam is condensed by the heat exchanger 4 in the water tank 3, and drives the steam driven pump 5 to do work, and the condensed water is sent back to the steam generator 2 to bring out the residual heat of the reactor core. When the system flow is low, the condensed water is sent back to the steam generator 2 through a bypassed fifth pipe 15, and the fluid density difference is utilized so as to drive the fluid through the system to form a natural cycle and bring out the reactor core waste heat. The reactor secondary side passive residual heat removal system of the present invention adopts a steam driven pump to strengthen the flow of the system loop fluid, enhance the heat removal capacity of the system, and utilize the vaporization and condensation in the system loop to efficiently and stably bring out the residual heat of the reactor core. By adopting passive safety design concept without relying on external driving force, the failure probability of the system can be greatly reduced, and the safety and economy of the system can be further improved.

Although the present application has been described with reference to the preferred embodiments, various improvements may be made and parts thereof may be replaced with equivalents without departing from the scope of the present application. In particular, as long as there is no structural conflict, the technical features mentioned in each embodiment can be combined in any way. The present application is not limited to the specific embodiments disclosed herein, but includes all technical solutions falling within the scope of the claims.

The invention claimed is:

1. A reactor secondary side passive residual heat removal system, wherein the system comprises:
    a containment vessel;
    a steam generator having a steam outlet and a feedwater inlet;
    a water tank in which a heat exchanger is arranged, the heat exchanger having a heat exchanger inlet and a heat exchanger outlet; and
    a steam driven pump having a steam port, a water inlet and a water outlet;
    wherein the steam generator, the water tank and the steam driven pump are placed in the containment vessel, the heat exchanger inlet is communicated with the steam outlet of the steam generator through a first pipe, the heat exchanger outlet is communicated with the water inlet of the steam driven pump through a second pipe, the water outlet of the steam driven pump is communicated with the feedwater inlet of the steam generator through a third pipe, and the steam port of the steam driven pump is communicated with the first pipe through a fourth pipe,
    wherein a first amount of steam generated from heat absorption by the steam generator enters the heat exchanger through the first pipe, and the first amount of steam is condensed into liquid water after heat exchange with water in the water tank,
    the liquid water in the heat exchanger flows into the second pipe through the heat exchanger outlet, and flows into the water inlet of the steam driven pump through the second pipe,
    the steam driven pump drives the liquid water to flow into the third pipe through the water outlet, and flows to the feedwater inlet of the steam generator,
    a second amount of steam generated from heat absorption by the steam generator flows to the steam port of the steam driven pump through the fourth pipe to drive the steam driven pump,
    wherein the steam outlet of the steam generator communicates directly with the steam port of the steam driven pump and the heat exchanger inlet.

2. The reactor secondary side passive residual heat removal system according to claim 1, wherein the first pipe is provided with a first isolation valve, the third pipe is provided with a second isolation valve, and the fourth pipe is provided with a third isolation valve.

3. The reactor secondary side passive residual heat removal system according to claim 2, wherein the first isolation valve, the second isolation valve and the third isolation valve are normally closed electric isolation valves.

4. The reactor secondary side passive residual beat removal system according to claim 2, wherein the first isolation valve, the second isolation valve and the third isolation valve are configured to open simultaneously after receiving an opening signal.

5. The reactor secondary side passive residual heat removal system according to claim 2, wherein the heat exchanger outlet is communicated with the feedwater inlet of the steam generator through a fifth pipe, and the fifth pipe is provided with a bypass valve.

6. The reactor secondary side passive residual heat removal system according to claim 5, wherein the third pipe is provided with a flow sensor, and when the flow sensor detects that the flow in the third pipe is lower than a preset value, the bypass valve is configured to open and the third isolation valve is configured to close.

7. The reactor secondary side passive residual heat removal system according to claim 5, wherein a bottom elevation of the heat exchanger is higher than top elevation of the steam generator.

8. The reactor secondary side passive residual heat removal system according to claim 1, wherein an inner wall surface of the containment vessel is provided with a recovery tank, and a sixth pipe is provided between the recovery tank and the water tank, wherein one end of the sixth pipe is connected to a bottom of the recovery tank, the other end of the sixth pipe is placed into an upper part of the water tank, and a bottom elevation of the recovery tank is higher than a top elevation of the water tank.

9. The reactor secondary side passive residual heat removal system according to claim 8, wherein a top of the containment vessel is in an arc shape.

10. The reactor secondary side passive residual heat removal system according to claim 8, wherein the recovery tank is arranged circumferentially along the inner wall surface of the containment vessel.

* * * * *